US010620621B2

(12) United States Patent
Ueki

(10) Patent No.: US 10,620,621 B2
(45) Date of Patent: Apr. 14, 2020

(54) REMAINING LIFE ASSESSMENT APPARATUS AND METHOD AS WELL AS WIND TURBINE GENERATOR SYSTEM

(71) Applicant: HITACHI, LTD., Tokyo (JP)

(72) Inventor: Yosuke Ueki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 68 days.

(21) Appl. No.: 16/076,804

(22) PCT Filed: Jan. 19, 2017

(86) PCT No.: PCT/JP2017/001634
§ 371 (c)(1),
(2) Date: Aug. 9, 2018

(87) PCT Pub. No.: WO2017/163562
PCT Pub. Date: Sep. 28, 2017

(65) Prior Publication Data
US 2019/0018403 A1    Jan. 17, 2019

(30) Foreign Application Priority Data

Mar. 25, 2016  (JP) .................................. 2016-062006

(51) Int. Cl.
*G05B 23/02* (2006.01)
*F03D 17/00* (2016.01)
(Continued)

(52) U.S. Cl.
CPC ......... *G05B 23/0283* (2013.01); *F03D 17/00* (2016.05); *G01L 1/10* (2013.01);
(Continued)

(58) Field of Classification Search
CPC ....... G05B 23/0283; F03D 17/00; G01L 1/10; G01M 5/0016; G01M 5/0033;
(Continued)

(56) References Cited

U.S. PATENT DOCUMENTS 4,480,480 A * 11/1984 Scott ................... E02B 17/0034
702/41
7,953,559 B2 * 5/2011 Sundermeyer ........... G01N 3/32
702/183
(Continued)

FOREIGN PATENT DOCUMENTS

JP   2005-325742 A   11/2005
JP      5065495 B2   10/2012
WO   2009/047121 A2   4/2009

OTHER PUBLICATIONS

International Search Report of PCT/JP2017/001634 dated Mar. 28, 2017.

*Primary Examiner* — Octavia Hollington
(74) *Attorney, Agent, or Firm* — Mattingly & Malur, PC

(57) ABSTRACT

To provide high-accuracy assessment of a remaining life of a composite material structure. A remaining life assessment system 5 for composite material structure includes: a load history assessment part 7 that calculates a history of load on a composite material based on output from a first sensor attached to the composite material; a state quantity assessment part 10 that calculates a state quantity of the composite material based on output from the first sensor or a second sensor; a state quantity change database 13 that holds previously recorded relation between the load history and the state quantity of the composite material; and a comparative assessment part 12 that compares the calculated load history and state quantity with the load history and state quantity stored in the state quantity change database 13.

15 Claims, 9 Drawing Sheets

(51) Int. Cl.
*G01M 5/00* (2006.01)
*G01L 1/10* (2006.01)

(52) U.S. Cl.
CPC ........ *G01M 5/0016* (2013.01); *G01M 5/0033* (2013.01); *G01M 5/0041* (2013.01); *G01M 5/0066* (2013.01); *F05B 2260/80* (2013.01); *F05B 2270/332* (2013.01); *F05B 2270/807* (2013.01)

(58) Field of Classification Search
CPC ............... G01M 5/0041; G01M 5/0066; F05B 2260/80; F05B 2270/332; F05B 2270/807
USPC .......................................................... 73/787
See application file for complete search history.

(56) References Cited

U.S. PATENT DOCUMENTS

| | | | |
|---|---|---|---|
| 8,621,934 B2* | 1/2014 | Hughes | F03D 1/065 73/808 |
| 9,090,339 B2* | 7/2015 | Arms | B64C 27/006 |
| 9,605,654 B2* | 3/2017 | Wickstrom | F03D 17/00 |
| 2007/0041837 A1 | 2/2007 | Ide et al. | |
| 2009/0324409 A1* | 12/2009 | Volanthen | G01B 11/18 416/61 |
| 2018/0335018 A1* | 11/2018 | Cao | G05B 23/0286 |

\* cited by examiner

FIG. 8
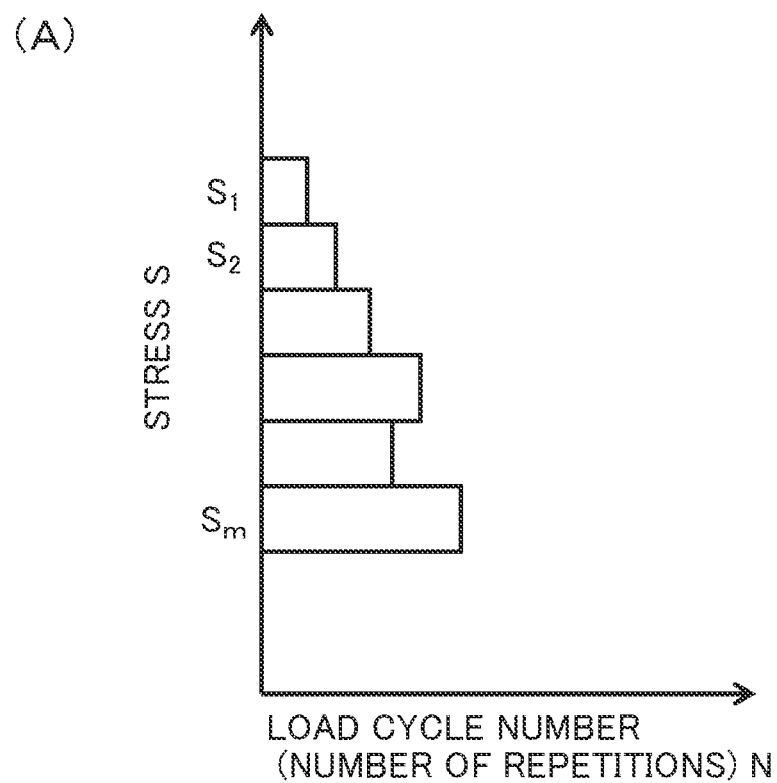
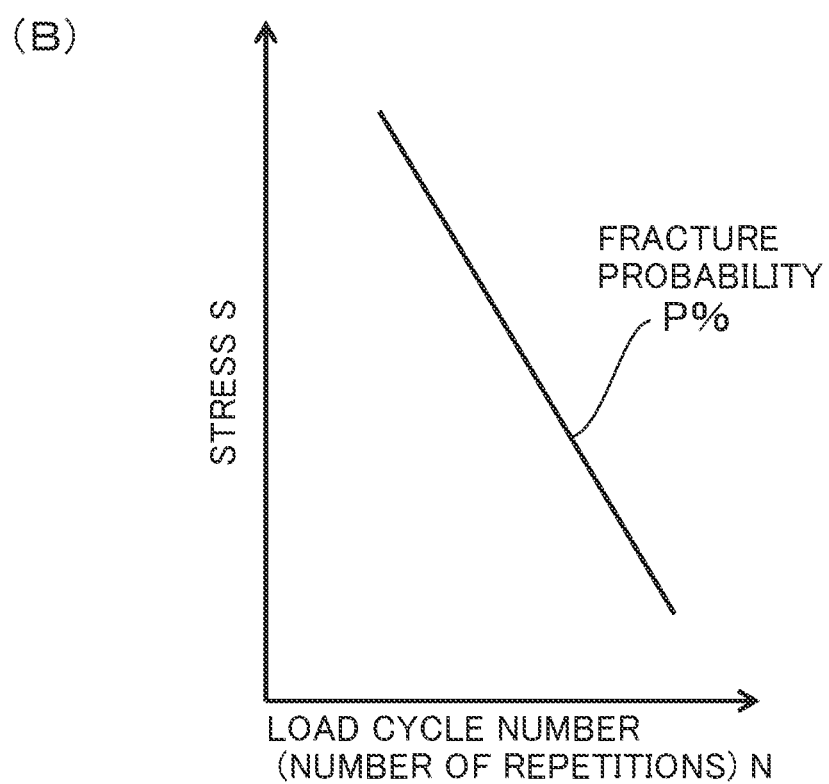

REMAINING LIFE ASSESSMENT APPARATUS AND METHOD AS WELL AS WIND TURBINE GENERATOR SYSTEM

TECHNICAL FIELD

The present invention relates to a remaining life assessment apparatus and method as well as a wind turbine generator system. More particularly, the invention relates to a remaining life assessment apparatus and method for composite material structure using a composite material such as fiber reinforced resin, as well as to a wind turbine generator system.

BACKGROUND ART

Recent years have seen an increasing number of cases where a composite material such as fiber reinforced resin (FRP) is used as a structural member of a machine structure. A representative example is blades assembled to a wind turbine unit. The wind turbine unit is an energy conversion device employed for power generation by wind. At least two blades are assembled to a rotor which is directly connected to a generator or indirectly connected thereto via a gear box or hydraulic power unit. The rotor is rotated by wind power acting on the blades while the rotational energy of the rotor is converted to an electric power by the generator. A housing part accommodating the generator and the like is called a nacelle which is commonly assembled to a tower. The wind turbine unit of such a structure is well known in the art. In particular, the blades are generally made of FRP excellent in specific rigidity and specific strength. The FRP as the structural member is finding application as, for example, vehicle body of automobile or railway vehicle besides the blades of the wind turbine unit. These structural members are exposed to repeated load application and hence, must be designed after ensuring sufficient fatigue strength. It is known that glass fiber and carbon fiber per se, which are used as a reinforcing fiber for FRP, sustain very little fatigue damage. However, a resin material used as a matrix sustains fatigue damage caused by repeated load application. As a result, the FRP suffers fatigue damage. Therefore, sufficient consideration should be given to the fatigue strength of FRP when designing a structure of the above product. However, the above products are used in a number of different environments. This makes it no easy task to make an accurate estimation of load on the structural member at the time of designing. In the case of wind turbine unit, for example, the load on the blades is assumed to vary significantly depending upon wind conditions to which the wind turbine unit is exposed. In fact, it is impracticable to accurately estimate the wind conditions over the entire life of the wind turbine unit. For accurate assessment of the load on the blades, it is effective to make a direct measurement of stress history by means of a strain gauge attached to the blade, as suggested by Patent Literature 1.

On the other hand, there are known several methods of directly assessing a damage state of the composite material without relying on the load history. These methods include, for example, a technique of using an AE sensor for capturing an AE wave emitted from internal damage of a material, and a technique of using supersonic flaw detection, and the like. As for the blades of wind turbine unit, for example, Patent Literature 2 discloses a technique in which an acceleration sensor is attached to the blade so as to determine a natural frequency of the blade based on the frequency characteristic of the blade and the soundness of the blade is determined based on change in the natural frequency.

CITATION LIST

Patent Literatures

Patent Literature 1: Japanese Unexamined Patent Application Publication No. 2005-325742
Patent Literature 2: U.S. Pat. No. 5,065,495

SUMMARY OF INVENTION

Technical Problem

If the measurement of stress history can be made in general, as suggested by Patent Literature 1, the following approach can be taken. If the history of stress amplitude is quantitatively assessed by using a rain flow method or the like and the stress amplitude is referred to a fatigue strength diagram (S-N diagram) based on a linear cumulative damage rule, it is possible to estimate how much of the entire life of the blade has been consumed by the load exerted thereon up until the point of measurement, namely the remaining life thereof. Unfortunately, it is known that not only the fatigue life of FRP but that of a structural material varies. While a variation range of the fatigue life of the material may also depend upon conditions, it is not unusual that the variation range of the fatigue life is half as long again as an average value thereof. That is, even though an accurate measurement of the load on the blade can be achieved, the accuracy of remaining life assessment is assumed to be significantly dependent upon the fatigue life variations intrinsic to FRP. In comparison to other materials, the composite material composed of at least two kinds of materials including reinforcing material and matrix material exhibits larger variations of fatigue life than homogeneous metal materials. Hence, it is never easy to provide high-accuracy assessment of the remaining life by using only the above-described method.

According to the method of directly assessing the damage state (state quantity) of the composite material, as suggested by Patent Literature 2, an assessment independent on the history of load exerted on the composite material can be provided in general. In the relation between the state quantities and the remaining lives of the composite material, however, the state quantity does not always coincide with the remaining life. According to experimental studies by the inventors, it is known that the above relation may sometimes have as many variations as the fatigue life. If the direct measurement of the state quantity indicative of the damage state of the composite material can be achieved, therefore, the high-accuracy assessment of the remaining life cannot always be provided.

As described above, the methods for estimating the damage state of the composite material structure can be divided roughly into two types which include methods based on the measurement of load history and methods based on the measurement of state quantity. However, neither of them necessarily achieves sufficient accuracies for providing quantitative estimate of the remaining life. In view of the above, an object of the invention is to provide high-accuracy assessment of the remaining life of the composite material structure.

Solution to Problem

According to a first aspect of the invention for solving the above problems, a remaining life assessment apparatus includes:

a load history assessment part that calculates a load history indicative of a cumulative damage degree of a composite material by using measurement data from one or more first sensors attached to the composite material forming a composite material structure;

a state quantity assessment part that calculates a state quantity indicative of a rigidity of an assessment region of the composite material by using the measurement data from the first sensor or one or more second sensors attached to the composite material;

a state quantity change database that holds a plurality of previously recorded state quantity change data pieces indicative of relation between the load history and the state quantity of the composite material; and a comparative assessment part that compares the calculated load history and state quantity with a plurality of the state quantity change data pieces recorded in the state quantity change database so as to obtain estimated state quantity change data indicative of state quantity change data corresponding to the calculated load history and state quantity; and displays and/or stores and/or outputs the estimated state quantity change data.

According to a second aspect of the invention, a remaining life assessment method includes the steps of:

calculating a load history indicative of a cumulative damage degree of a composite material by using measurement data from one or more first sensors attached to the composite material forming a composite material structure;

calculating a state quantity indicative of a rigidity of an assessment region of the composite material by using measurement data from the first sensor or one or more second sensors attached to the composite material;

referring to a state quantity change database that holds a plurality of previously recorded state quantity change data pieces indicative of relation between the load history and the state quantity of the composite material; and comparing the calculated load history and state quantity with a plurality of the state quantity change data pieces stored in the state quantity change database so as to obtain estimated state quantity change data indicative of state quantity change data corresponding to the calculated load history and state quantity, followed by displaying and/or storing and/or outputting the estimated state quantity change data.

According to a third aspect of the invention, a wind turbine generator system includes:

the above-described remaining life assessment apparatus;

a wind turbine generator including the above-described first sensor or the above-described first sensor and second sensor; and an external apparatus for displaying and/or storing the above-described estimated state quantity change data.

Advantageous Effects of Invention

The invention provides for high-accuracy assessment of the remaining life of composite material structure.

BRIEF DESCRIPTION OF DRAWINGS

FIG. 8A shows an example of an explanatory diagram illustrating a stress frequency distribution according to the embodiment.

FIG. 8B shows an example of a fatigue diagram according to the embodiment.

DESCRIPTION OF EMBODIMENTS

Embodiments of the invention will hereinafter be described with reference to the accompanying drawings.

A. General Outline

According to the embodiment, one or more sensors or plural types of sensors are used for taking measurements of one or more kinds of physical quantities of a composite material structure that are varied by external force or fatigue damage. Both the history of load to which the structure has been exposed and the state quantity reflecting the damage state of the structure are acquired based on the measured physical quantity. Further, a relation between the state quantity and the load history including the variations thereof is previously prepared as a database. A position of the present relation between the load history and the state quantity in the range of variations can be determined by referring the acquired load history and state quantity to the database. By combining the characteristics of these parameters, the embodiment is adapted to provide a high-accuracy assessment of the remaining life while eliminating the influence of the fatigue life variations intrinsic to the composite material.

While the embodiment includes a plurality of means for solving the above problems, an example thereof is a remaining life assessment system for composite material structure which includes: a load history assessment part that calculates a history of load on a composite material based on data a first sensor attached to the composite material; a state quantity assessment part that calculates a state quantity of the composite material based on data from the first sensor or a second sensor attached to the composite material; a database that holds previously recorded relation between the load history and the state quantity of the composite material; and a comparative assessment part that compares the calculated load history and the calculated state quantity with the recorded load history and state quantity in the database.

B. Remaining Life Assessment System (Remaining Life Assessment Apparatus)

First Embodiment

Figure 1:
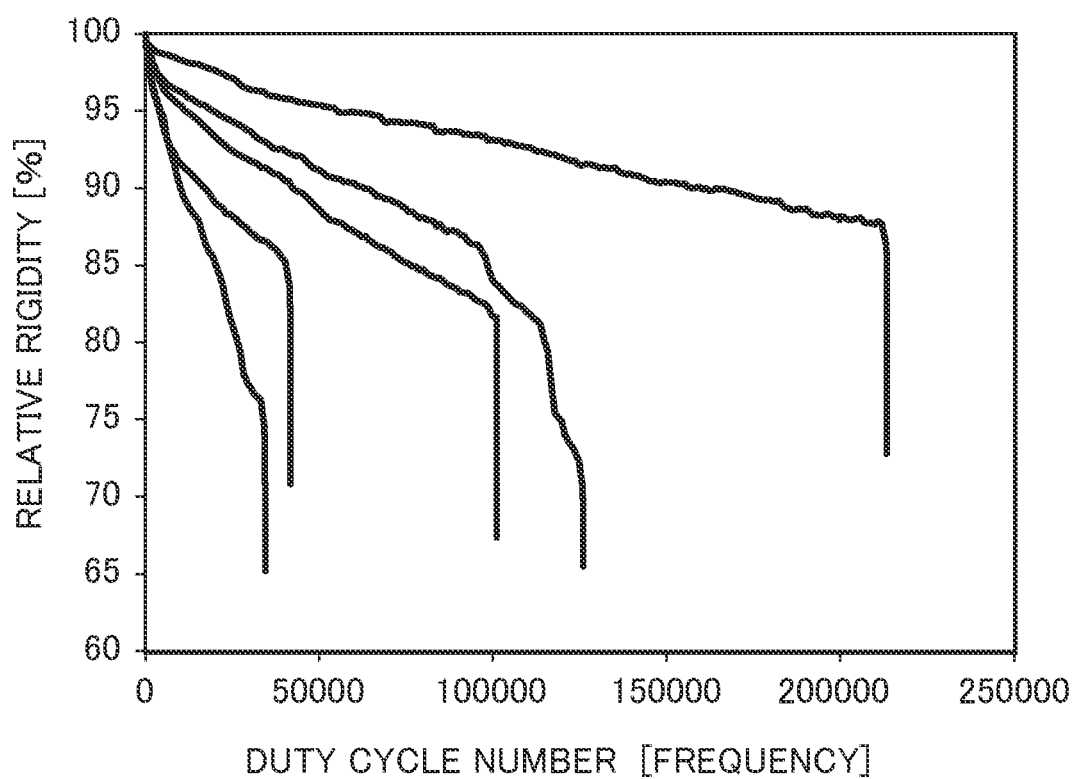
FIG. 1 is a graph showing an example of measurement results of rigidity change in an FRP material in fatigue test.

FIG. 1 shows an example of measurement results of rigidity change in an FRP material in fatigue test.

FIG. 1 shows the results of measurement of rigidity change associated with fatigue damage of five samples which are made of the same FRP material and were subjected to a fatigue test under the same conditions. Respective ends of plotted curves represent points of final fracture, namely, fatigue life. First, attention is given to the respective results of fatigue life. A sample exhibiting the shortest life was fractured by 50,000 or less duty cycles, while a sample achieving the longest fatigue life endured more than 200,000 duty cycles. Although this example shows the test results of only five samples, the results indicate the fact that the samples have about four-fold variation in fatigue life. In a case where only the load history is known, or where the abscissa is assumed to be the observables, the estimated fatigue life in this example must have about four-fold variation. Next, attention is given to rigidity decrease associated with fatigue damage. It is seen from the graph that all the samples are progressively decreased in rigidity from the initial phase of the fatigue test. Even though the samples are made of the same FRP material, the mode of rigidity decrease varies depending upon the laminated configuration, a waveform pattern of imposed stress and the like. However, it is known that the FRP may sometimes be more susceptible to obvious microscopic change in physical property associated with fatigue damage than a homogeneous metal material. Focusing on the results of the respective samples, it is seen that the samples of the shorter lives exhibit the sharper decrease in rigidity with respect to the load cycle number. Provided that the ordinate in FIG. 1 is the observable quantity, therefore, how much of the entire life of each sample has been consumed (the degree of damage based on a linear cumulative damage rule) can be assessed with relatively high accuracies. Unfortunately, it would be difficult to estimate the remaining life with a sufficient accuracy because the absolute lifetime significantly varies from sample to sample. In this connection, the embodiment utilizes the macroscopic change in physical property associated with the fatigue damage specific to the composite material. As described below, the embodiment provides high-accuracy estimation of the remaining life by using both a load history 8 and a state quantity 9.

Figure 2:
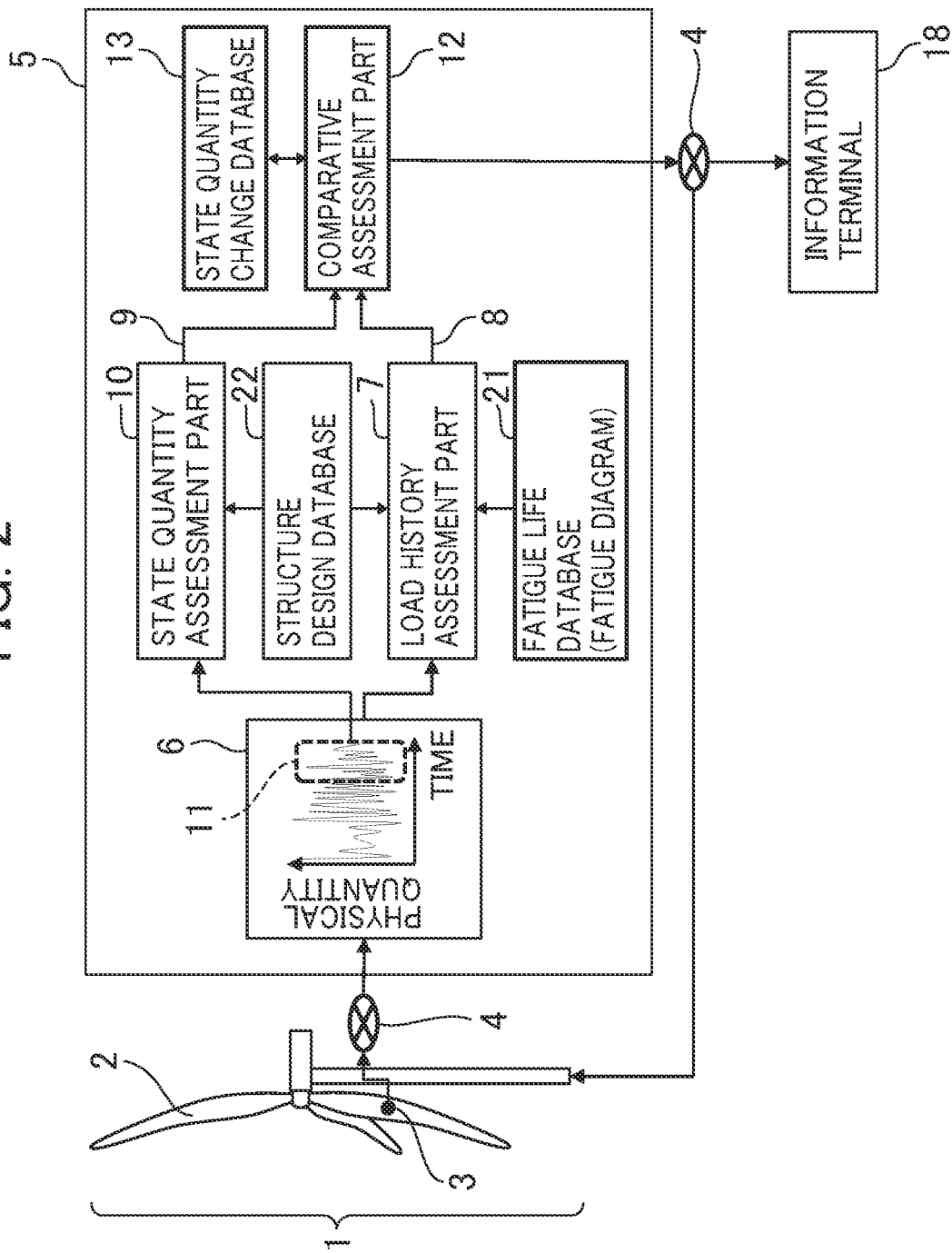
FIG. 2 is a conceptual diagram schematically showing an example of a remaining life assessment system according to an embodiment of the invention.

FIG. 2 is a conceptual diagram schematically showing an example of a remaining life assessment system according to the embodiment of the invention.

FIG. 2 shows an example of a remaining life assessment system 5 (remaining life assessment apparatus) for estimating a remaining life of blades 2, for example, of a wind turbine unit 1 assembled in a wind turbine generator system. First, the blades 2 are provided with one or more sensors 3 capable of measurement of physical quantity varying in conjunction with dynamic deformation thereof. An acceleration sensor for picking up the vibrations of the blade 2 is desirable in terms of reliability and cost of the sensor. However, a strain sensor such as strain gauge is also usable. A mounting mode of the sensor 3 is not necessarily limited to one where the sensor is directly mounted to the blade 2. For example, a laser displacement gauge may be attached to a tower such that a deformation amount of the blade 2 can be measured. Further, more than one sensor 3 or more than one type of sensor 3 may be employed. In FIG. 2, measurement data 6 collected by the sensor 3 is transferred to the remaining life assessment system 5 via a communication network 4 such as Internet. Such a mode provides an effect that a single remaining life assessment system 5 can be used for a plurality of assessment objects. Depending upon the quality of the communication network 4, there may be a case where the transfer of the measurement data 6 falls short of the quality for making assessment. In such a case, the remaining life assessment system 5 may be directly connected to the sensor 3 so as to make assessment on a site where the product is installed. The communication network 4 may be in any of the various forms including wireless networks, wired networks and combinations thereof.

The remaining life assessment system 5 includes different processing parts such as a load history assessment part 7, a state quantity assessment part 10 and a comparative assessment part 12 as well as different databases such as a fatigue life database 21, a structural design database 22 and a state quantity change database 13.

Figure 3:
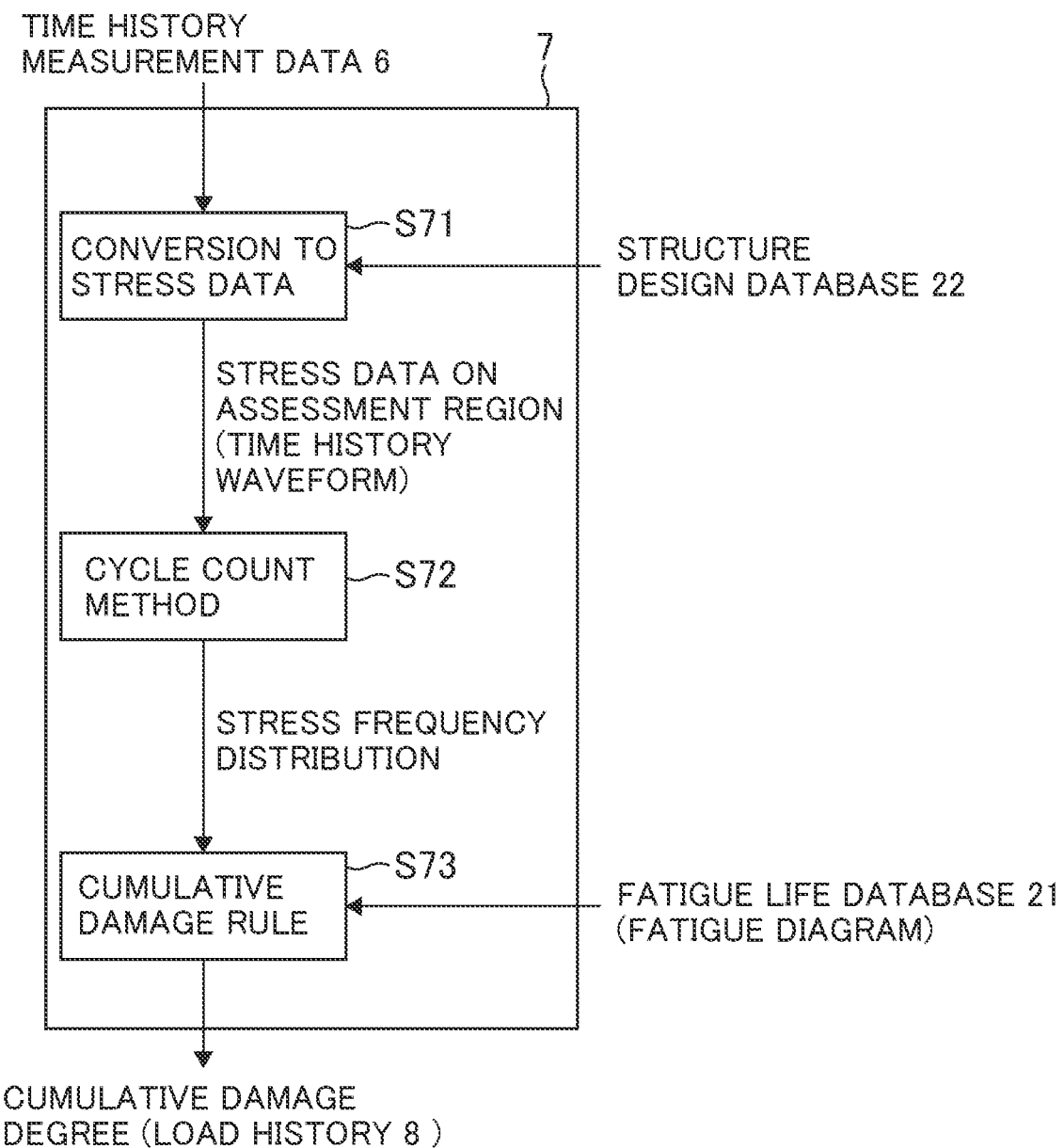
FIG. 3 is a flow chart showing an exemplary operation of a load history assessment part constituting the remaining life assessment system according to the embodiment.
Figure 9:
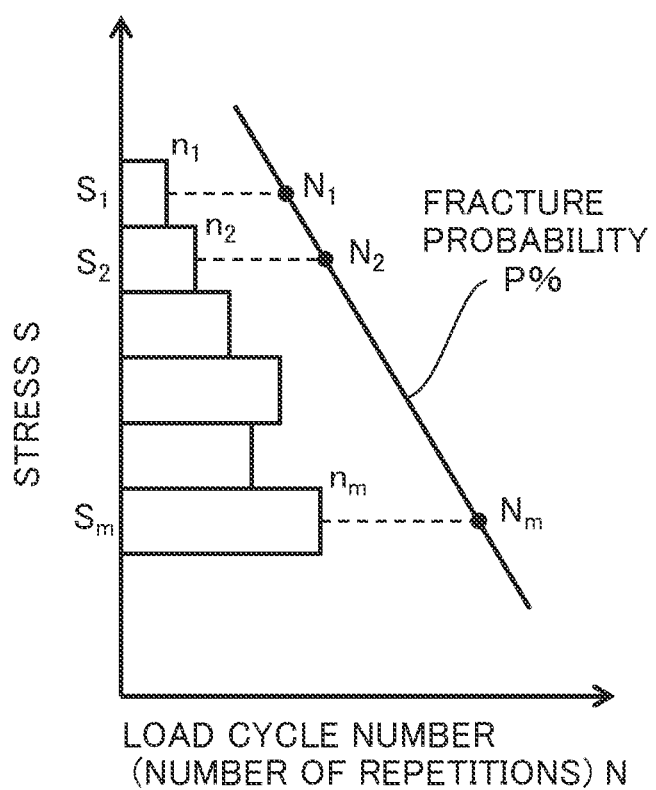
FIG. 9 shows an example of an explanatory diagram illustrating a process of obtaining a load history according to the embodiment.

Next, description is made on the load history assessment part 7. FIG. 3 is a flow chart showing an operation performed in the load history assessment part 7. FIG. 8A shows an example of an explanatory diagram illustrating a stress frequency distribution according to the embodiment. FIG. 8B shows an example of a fatigue diagram according to the embodiment. FIG. 9 shows an example of an explanatory diagram illustrating a process of obtaining a load history according to the embodiment.

The load history assessment part 7 performs the following processing on data from the all sensors 3 or a predetermined one or more sensors 3, the data stored up to the present time $t_1$. For assessment of the load history, the load history assessment part 7 converts a physical quantity such as acceleration, strain or displacement as measured by the sensor 3 to stress (S71). In a case where a strain sensor is used and where a sensor mounting position is defined as an assessment point, a stress waveform can be readily obtained by multiplying a strain measurement value by an elastic modulus of the material. On the other hand, in a case where a physical quantity other than strain is measured by the sensor 3 (e.g., acceleration sensor), and/or where the sensor mounting position is different from an assessment region, the most effective measure is computer simulation based on finite element method or the like although this measure requires conversion from the measured physical quantity to stress and interpolation of unmeasured points. Alternatively, structural design data representing a relation between stress and sensor output obtained by the computer simulation may be previously prepared and stored as the structural design database 22 such that the load history assessment part 7 can determine the stress at the assessment region by referring the sensor output to the structural design database 22. The load history assessment part 7 obtains the stress frequency distribution (see FIG. 8A) representing a load frequency per stress level by applying a cycle count method to a time history waveform of the stress thus obtained (S72). The cycle count method is typically represented by a rain flow method. Further, the fatigue life database 21 stores a fatigue diagram (see FIG. 8B) representing a relation between the stress on the material per assessment region and the load cycle number (number of repetitions) provided that fracture probability is defined as predetermined P %. By referring to the fatigue diagram stored in the fatigue life database 21 as shown in FIG. 8B, the load history assessment part 7 applies a cumulative damage rule such as a minor rule to the stress frequency distribution as shown in FIG. 8A so as to work out the load history 8 by converting the stresses to a scale representing the degree of fatigue damage such as the degree of cumulative damage (S73).

As shown in FIG. 9 generated from the graphs of FIG. 8A and FIG. 8B, for example, provided that $N_i$ denotes the repeated load cycle number (number of repetitions) to fracture for each stress $S_i$ on the S (stress)–N (load cycle number: number of repetitions) curve of the material and that each stress $S_i$ is repeated $n_i$ times in each load cycle (number of repetitions), the cumulative damage degree D (fatigue fracture occurs when D=1) is calculated by the following equation:

$$D=\Sigma(n_i/N_i), \text{ where } i \text{ denotes an integer of 1 to } m.$$

It is desirable to perform the above-described processing on all the data collected from the start of the apparatus. However, the computational processing need not necessarily be done on all the previous data. A method where the processing is periodically performed to calculate and store the cumulative damage degree may be adopted. However, this method may not always be a desirable type. In the method where all the raw time history data outputted from the sensor 3 is stored, the data volume is increased so much as to result in likelihood of occupying a larger data storage area or of requiring a larger capacity for data storage. However, the likelihood of such a problem will be notably reduced by adopting a method where only the calculated cumulative damage degrees are stored and integrated as needed. That is, one of the best methods is assumed to express the load history 8 by using the cumulative damage degree as the representative value.

According to the embodiment, the state quantity assessment part 10 performs not only the above-described assessment of load history but also the assessment of the state quantity 9 varying depending upon the damage degree concurrently or collaterally, namely at proper time. The assessment of the state quantity 9 is made by the state quantity assessment part 9.

Figure 4:
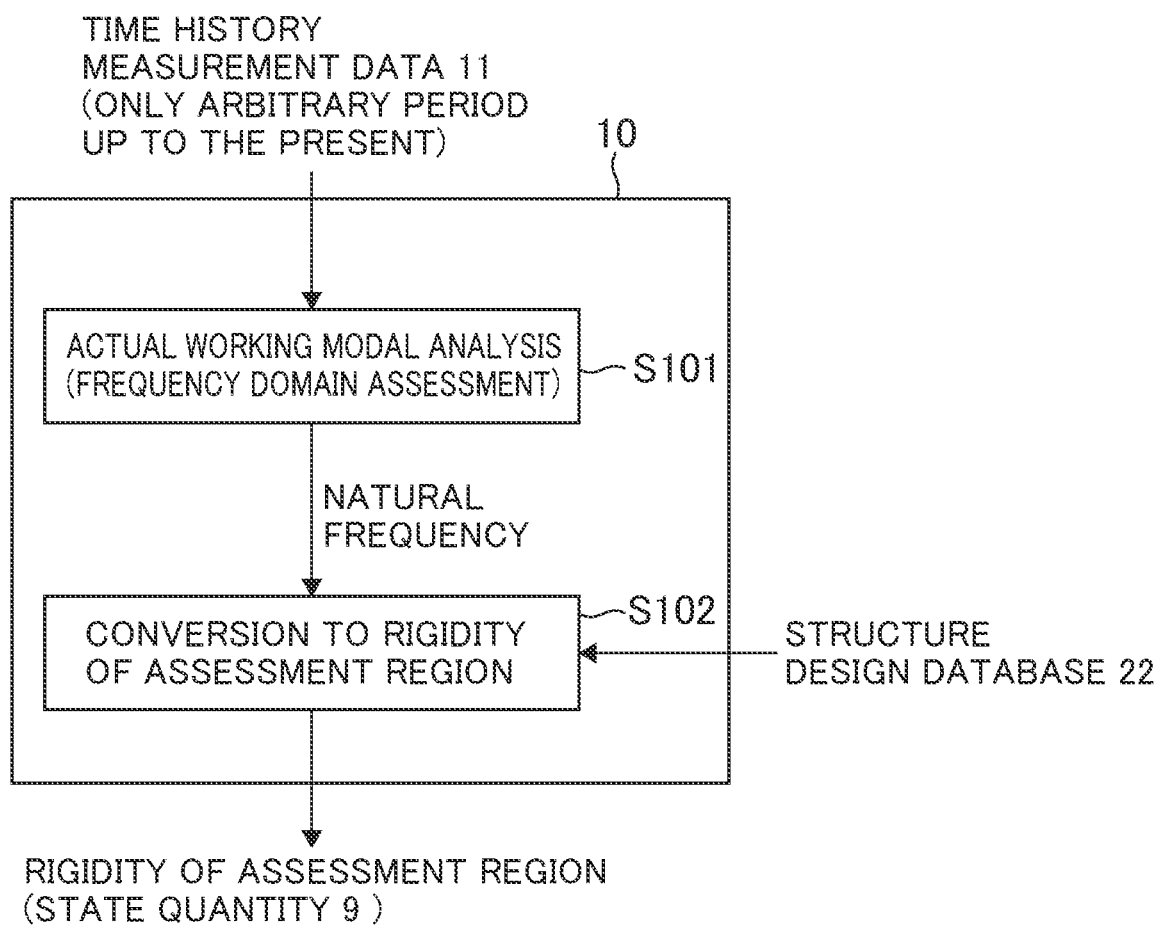
FIG. 4 is a flow chart showing an exemplary operation of a state quantity assessment part constituting the remaining life assessment system according to the embodiment.

FIG. 4 shows an example of a flow chart of an operation performed in the state quantity assessment part 10. As described in connection with the background art, a multitude of methods of measurement for assessing the damage state of the composite material are known in the art. The measurement method adopted by the embodiment need not be limited to a particular one of the above methods. However, if the method permits the sensor 3 used for obtaining the above-described load history 8 to be used as it is, the sensor to be mounted in a real machine may have a simpler configuration, which leads to cost reduction and enhanced reliability of the system. The sensor 3 used for obtaining the load history 8 is for measurement of the physical quantity, such as acceleration, strain or displacement, that varies with the deformation of a structure. In this case, therefore, the magnitude of the measurement value given by the sensor does not uniquely indicate the damage state. In the case of using such sensors 3, it is desirable to use a method, for example, where data collected in a given period is assessed on the basis of frequency domain. The state quantity assessment part 10 can obtain a natural frequency of the structure by analyzing the data collected in the given period by using a method such as actual working modal analysis (S101). The natural frequency is a value varying depending upon the rigidity of the structure and is proportional to the square root of rigidity. That is, the state quantity assessment part 10 can calculate back the rigidity of the structure (state quantity 8) if the natural frequency is known (S102).

Rigidity E can be calculated by the following equation where f denotes the natural frequency, and $\alpha$ denotes a predetermined parameter.

$$E=\alpha f^2$$

As shown in FIG. 1, the rigidity of the FRP material is a parameter varying with the fatigue damage therein. Namely, if the assessment in the frequency domain is used, the damage state can be assessed by using the same sensor as the sensor 3 used for assessment of the load history. A period 11 of collecting data used for frequency domain assessment should be decided based on the natural frequency of the structure as the assessment object. Alternatively, for example, measurement data constantly collected in a given period from the present to the past may be consecutively analyzed while only values indicating the damage state, such as the natural frequency as the analysis results, may be stored. If this method is adopted, the data storage capacity can be minimized. This embodiment illustrates the method of calculating the rigidity backward from the natural frequency of the structure. However, if the magnitude of external force exerted on the structure can be assessed with high accuracies, a sensor, such as a strain gauge, adapted for direct measurement of deformation volume can be employed. The rigidity of an assessment object region can be directly assessed from a relation between the external force and the deformation volume. Otherwise, the structural design database 22 containing structural design data representing rigidities for predetermined natural frequencies may be previously prepared. The state quantity assessment part 10 can determine the rigidity of the assessment region by referring the natural frequency to the structural design data 22.

Figure 5:
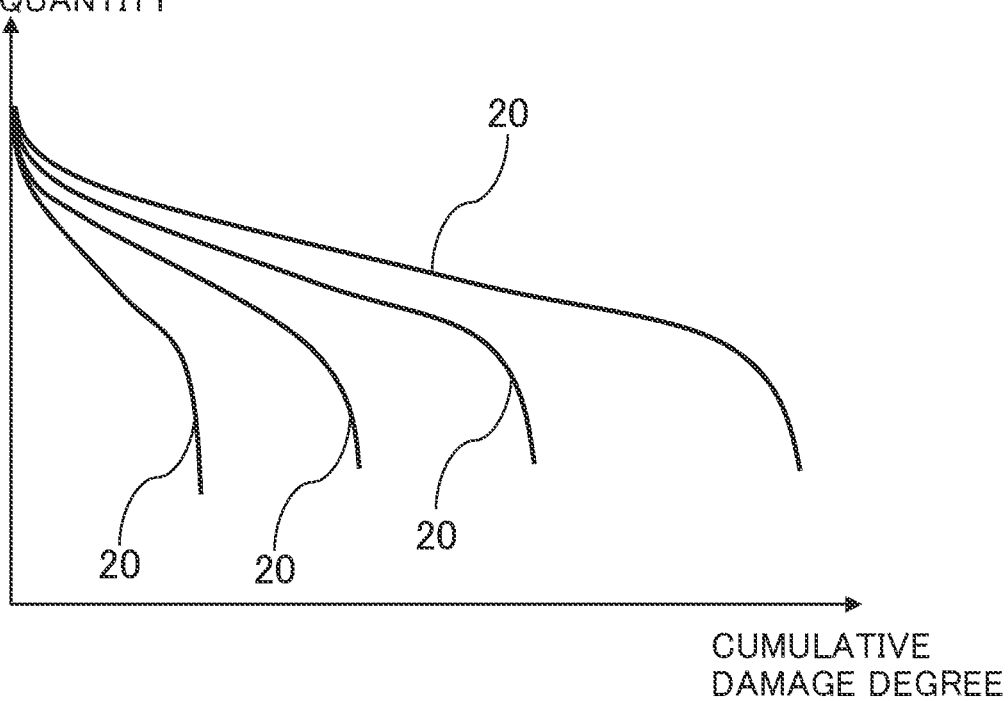
FIG. 5 is a schematic diagram showing data stored in a state quantity change database constituting the remaining life assessment system according to the embodiment.

The comparative assessment part 12 in FIG. 2 compares the relation between the load history 8 (cumulative damage degree) and the state quantity 9 (rigidity), as obtained by taking the above-described procedure, with the relation between the load history and the state quantity which is previously stored in the state quantity change database 13. FIG. 5 is a schematic diagram showing data stored in a state quantity change database constituting the remaining life assessment system according to the embodiment. As shown in FIG. 5, a relation 20 between the state quantity 9 acquired by direct measurement and the cumulative damage degree calculated based on the load history 8 is previously stored in this database 13. In other words, the database 13 is equivalent to a relation of the FRP material shown in FIG. 1 between the rigidity (state quantity 9) associated with the fatigue damage and the load cycle number (cumulative damage degree: load history 9). It is desirable to construct the database 13 based on the results of tests previously performed. That is, the construction of the database is to keep building up the relations between the state quantity 9 and the load history 8 by accumulating the test results as shown in FIG. 1.

Figure 6:
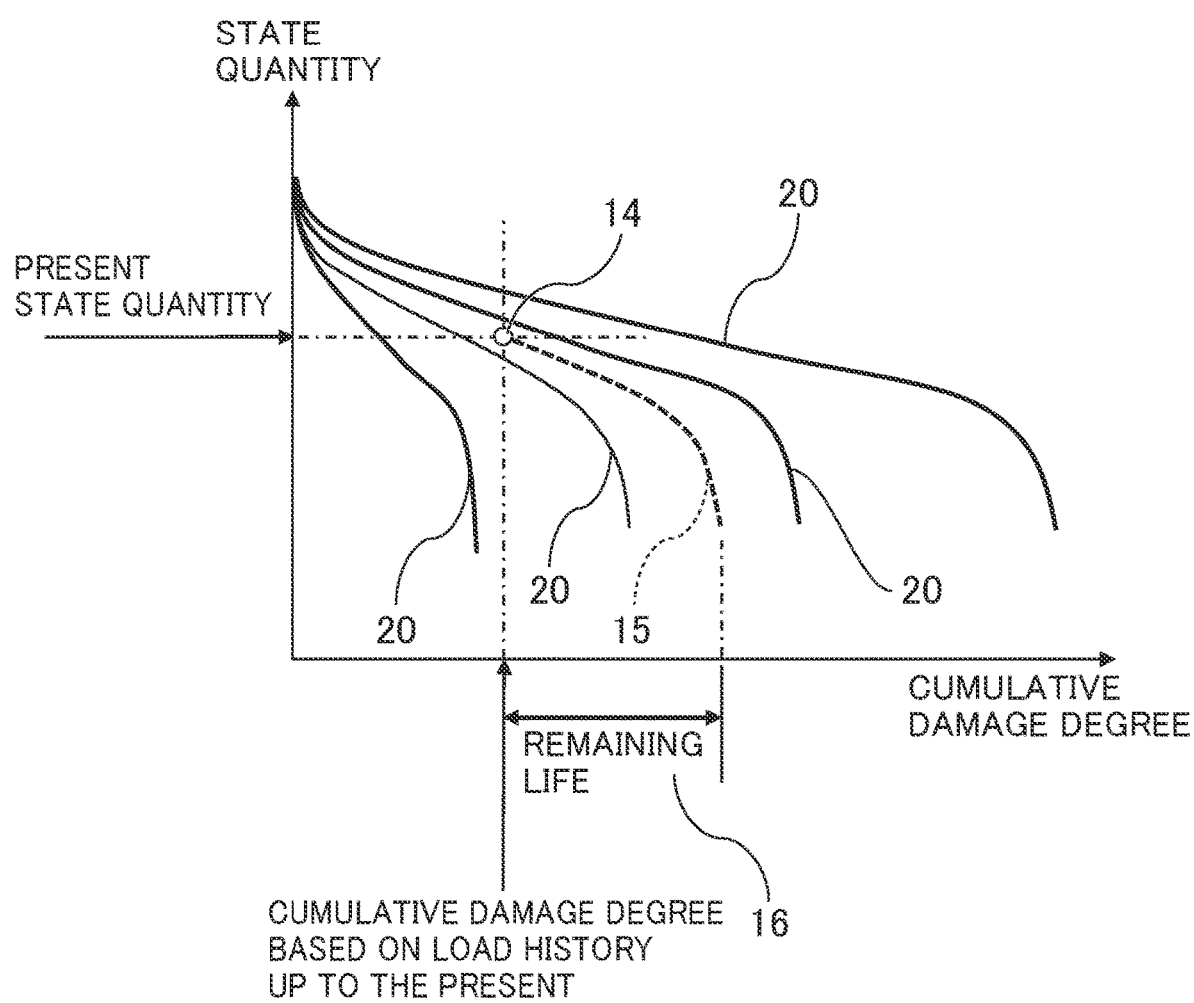
FIG. 6 is a schematic diagram showing a remaining life calculation process by a comparative assessment part constituting the remaining life assessment system according to the embodiment.

FIG. 6 is a schematic diagram showing a remaining life 16 performed by the comparative assessment part 12. The comparative assessment part 12 refers the calculated state quantity 9 and the load history 8 to the ordinate and the abscissa of the database 13, respectively. A position of intersection 14 of these coordinate axes means to represent a relative position of the present damage state including the variations of fatigue damage behavior of the material. Therefore, the fatigue damage behavior of the material at the position actually regarded as the assessment object can be expressed by an estimation curve 15 passing through this intersection 14. The database 13 is constructed by accumulating the test results. Strictly speaking, therefore, it is assumed that data representing a curve passing through the intersection 13 obtained from the measurement values of the real machine cannot be previously stored in the database. Hence, the comparative assessment part 12 needs to generate the estimation curve 15 through the intersection 14 by interpolation using the data stored in the state quantity change database 13. There are various methods for generating the estimation curve by interpolation. For example, the following simple method serves well. A data piece passing through the closest point to the intersection 14 (or closest to a predetermined threshold value) is adopted out of all the data points stored in the state quantity change database 13. The estimation curve 15 is generated by expanding or reducing the adopted data peace in the direction of abscissa (cumulative damage degree) of the database 13 so that the estimation curve may pass through the intersection 14. By referring to the generated estimation curve 15, the remaining life 16 to the end of fatigue life can naturally be estimated with high accuracies on the basis of a scale of cumulative damage degree. Namely, the application of the method of the embodiment provides high-accuracy assessment of the remaining life of the structure while eliminating the influence of variations latent in the material used in the structure. An additional method is necessary for estimating the increase in cumulative damage degree per hour from the present to future. If this estimation is practicable, the remaining life can be estimated on the basis of a time scale most instantly recognizable to a user. In the above-described embodiment, the estimation curve 15 is generated based on the state quantity change data stored in the state quantity change database 13 in order to estimate the remaining life in the future. If the comparative assessment part 12 keeps providing the above-described assessment on a regular basis or with proper timing after start-up of the structure, the plural intersections 14 can be obtained. A data piece connecting these intersections is fed back to the state quantity change database 13 as a new piece of data (estimated state quantity change data) obtained from the measurements of real machine. By doing so, the state quantity change database 13 can be updated to more excellent version.

Figure 7:
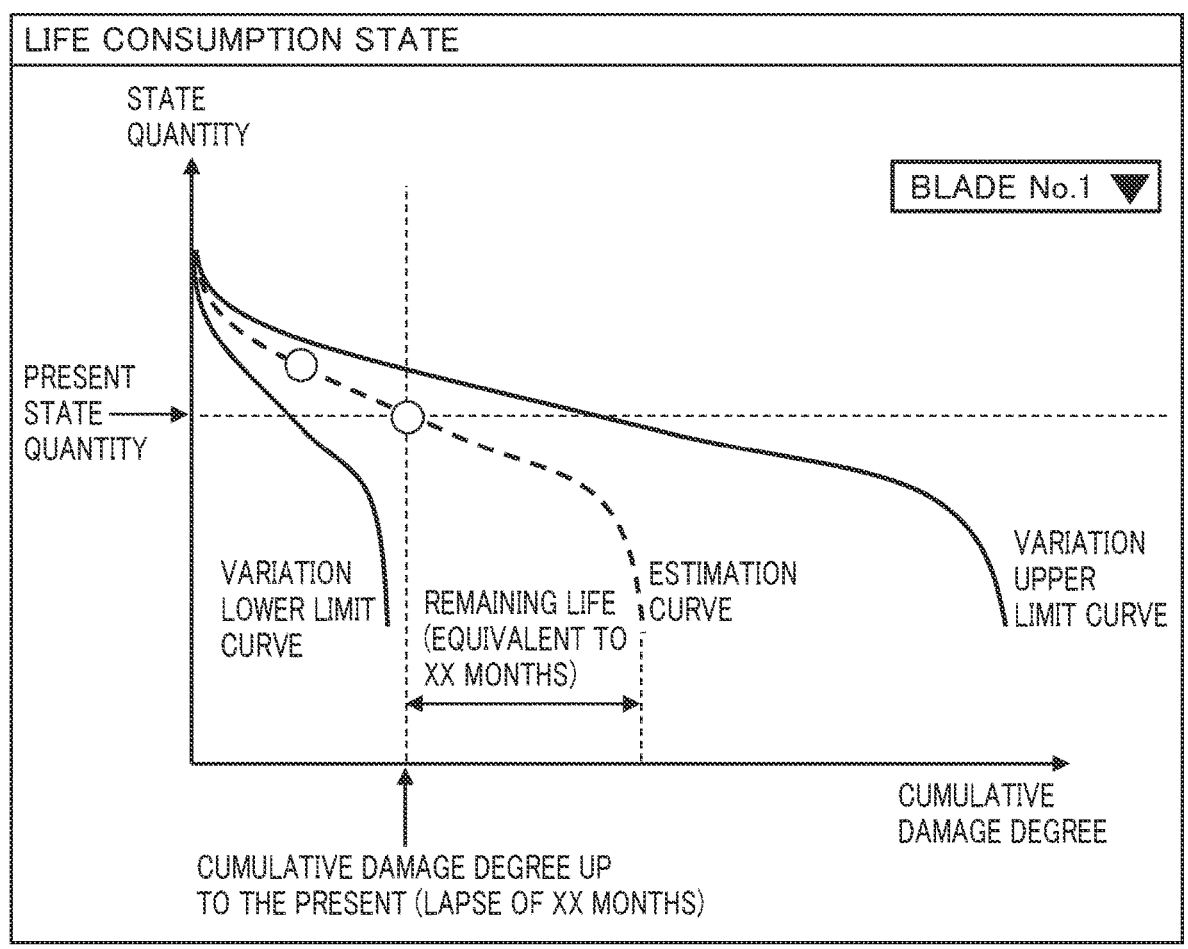
FIG. 7 is a diagram showing an example of a user interface screen of the remaining life assessment system according to the embodiment.

FIG. 7 is a diagram showing an example of a user interface screen of the remaining life assessment system according to the embodiment. The comparative assessment part 12 stores, in the state quantity change database 13, the process and the results of the remaining life assessment using the above-described state quantity 9, load history 8 and database 13, and/or the data such as the remaining life. Further, the comparative assessment part 12 refers to the state quantity change database 13 so as to display these estimated state change data pieces at a display unit in the remaining life assessment system 5. Furthermore, the comparative assessment part outputs these estimated state change data pieces to an information terminal 18 which is used for displaying the data pieces to the user and/or for storing these data pieces for display to the user. Particularly, the use of a graphical user interface (GUI) as shown in FIG. 7 permits the user to instantly grasp the present degree of damage progression of the assessment region and the position of damage degree in the variation range. This facilitates the planning of maintenance schedule or component replacement schedule. Further, the result of remaining life assessment is not only reported to the user but also can be directly used for system control. In the case of the wind turbine unit, for example, system control may be so changed as to reduce the load if the remaining life is shorter than expected. If the remaining life is longer than expected, the system control may be so changed as to place emphasis on power generation efficiency rather than on damage reduction.

For the purpose of convenience, FIG. 2 illustrates the case where both the load history 8 and the state quantity 9 are calculated using the measurement data obtained from a single sensor. However, the embodiment does not mean to limit the number or type of the sensor to be used. Each of the load history 8 and the state quantity 9 may be calculated using plural kinds of data pieces obtained from plural sensors. Further, each of the load history 8 and the state quantity 9 can be calculate using the measurement data pieces from different sensors.

Second Embodiment

While the first embodiment provides the assessment of the remaining life by using only one kind of state quantity as the state quantity, two or more kinds of state quantities may be used for assessment. In that case, the database 13 shown in FIG. 2 is expressed in a space of three or more dimensions. However, a basic procedure of the remaining life assessment is the same as that of the first embodiment. To use plural kinds of state quantities for assessment, it is naturally required to mount plural types of sensors to the real machine or to install plural types of data analysis methods in the system 5. Therefore, the system per se becomes more complicated. At the same time, such a system is adapted to multidirectionally capture a variety of physical phenomena caused by the damage in the material and to reflect the influences thereof in the life estimation. Accordingly, the system can achieve an increased accuracy of remaining life estimation.

C. Additional Statement

It is noted that the invention is not limited to the foregoing embodiments but includes a variety of modifications. For example, the foregoing embodiments have been detailed to clarify the present invention which is not necessarily limited to what includes all the above-described components. Further, some of the components of one embodiment can be replaced with some component of another embodiment. It is also possible to add a component of one embodiment to the structure of another embodiment. A part of the structure of one embodiment can permit the deletion thereof or permit addition of or replacement with some component of another embodiment.

The above-described arrangements, functions, processing parts, process tools and the like may each be partly or totally implemented in hardware by designing integrated circuit or the like, for example. The above-described arrangements, functions and the like may each be implemented in software where the processor understands and executes a program of implementing each function. Information items such as programs, tables and files can be stored in recording devices such as memory, hard disc, and SSD (Solid State Drive), or otherwise in recording media such as IC card, SD card and DVD.

The drawings only illustrate control lines and information wiring that are regarded as necessary but do not necessarily illustrate all the control lines and information wirings in the product. It could actually be considered that almost all the components are connected with one another.

LIST OF REFERENCE SIGNS

1: wind turbine unit
2: blades
3: sensor
4: communication network
5: remaining life assessment system
6: measurement data
7: load history assessment part
8: load history
9: state quantity
10: state quantity assessment part
11: period of collecting data used for state quantity assessment 12: comparative assessment part
13: database
14: intersection point
15: estimation curve
16: remaining life
17: feedback of data
18: information terminal
19: path of reflecting assessment result to system control
20: previous data representing relation between state quantity and cumulative damage degree
21: fatigue life database

The invention claimed is:

1. A remaining life assessment apparatus comprising:
a load history assessment part that calculates a load history indicative of a cumulative damage degree of a composite material by using measurement data from one or more first sensors attached to the composite material forming a composite material structure;
a state quantity assessment part that calculates a state quantity indicative of a rigidity of an assessment region of the composite material by using the measurement data from the first sensor or one or more second sensors attached to the composite material;
a state quantity change database that holds a plurality of previously recorded state quantity change data pieces indicative of relation between the load history and the state quantity of the composite material; and
a comparative assessment part that compares the calculated load history and state quantity with a plurality of the state quantity change data pieces recorded in the state quantity change database so as to obtain estimated state quantity change data indicative of state quantity change data corresponding to the calculated load history and state quantity; and displays and/or stores and/or outputs the estimated state quantity change data.

2. The remaining life assessment apparatus according to claim 1,
wherein the load history assessment part calculates a stress frequency distribution from a time history waveform of stress by using a rain flow method or another cycle count method, and
calculates the cumulative damage degree by applying a minor rule or another cumulative damage rule to the stress frequency distribution, and thus obtains the load history.

3. The remaining life assessment apparatus according to claim 2,
wherein the state quantity assessment part obtains the state quantity by obtaining a natural frequency of the composite material structure by performing frequency domain analysis or actual working modal analysis of measurement data pieces collected by the first sensor or the second sensor in a predetermined period, followed by converting the resultant natural frequency to the rigidity.

4. The remaining life assessment apparatus according to claim 3,
wherein the comparative assessment part generates a curve of the estimated state quantity change data by extracting a curve close to a data point indicative of the calculated state quantity and the load history, out of plural curves of the plural state quantity change data pieces previously stored in the state quantity change database, followed by performing interpolation processing in a manner that the curve passes through the data point; determines a remaining life from the curve of the estimated state quantity change data; and enables a display unit to display the estimated state quantity change data and the remaining life on a graph plotting the state quantity and the load history on the respective coordinate axes and/or stores the estimated state quantity change data and the remaining life in a storage unit, or outputs the estimated state quantity change data and the remaining life to an external apparatus for display and/or storage purpose.

5. The remaining life assessment apparatus according to claim 2, further comprising a first structural design database that holds previously recorded relation between a sensor output and stress,
wherein in a case where the first sensor is an acceleration sensor or a sensor for measuring a physical quantity other than strain and/or where a mounting position of the first sensor is different from an assessment region,
the load history assessment part refers to the first structural design database so as to determine a stress from acceleration data from the first sensor or a data output other than strain; and calculates the stress frequency distribution.

6. The remaining life assessment apparatus according to claim 2,
wherein in a case where the first sensor is an acceleration sensor or a sensor for measuring a physical quantity other than strain and/or where a mounting position of the first sensor is different from an assessment region,
the load history assessment part performs conversion to stress and interpolation of unmeasured points by means of computer simulation based on a finite element method using acceleration data from the first sensor or data output other than strain, followed by calculation of the stress frequency distribution.

7. The remaining life assessment apparatus according to claim 2,
wherein in a case where the first sensor is a strain sensor, the load history assessment part calculates a stress by multiplying strain data from the first sensor by an elastic modulus of the composite material used in the composite material structure, and then calculates the stress frequency distribution.

8. The remaining life assessment apparatus according to claim 1,
wherein the state quantity assessment part obtains a natural frequency of the composite material structure by performing frequency domain analysis or actual working modal analysis of measurement data pieces collected by the first sensor or the second sensor in a predetermined period, and
calculates the rigidity of the assessment region that is proportional to the square of the natural frequency, and thus obtains the state quantity.

9. The remaining life assessment apparatus according to claim 1, further comprising a second structural design database that holds previously recorded relation between natural frequency and rigidity,
wherein the state quantity assessment part obtains a natural frequency of the composite material structure by performing frequency domain analysis or actual working modal analysis of measurement data pieces collected by the first sensor or the second sensor in a predetermined period, and
obtains the state quantity by converting the resultant natural frequency to the rigidity by referring to the second structural design database.

10. The remaining life assessment apparatus according to claim 1, wherein the comparative assessment part generates a curve of the estimated state quantity change data by extracting a curve close to a data point indicative of the calculated state quantity and load history, out of plural curves of the plural state quantity change data pieces previously stored in the state quantity change database, followed by performing interpolation processing in a manner that the curve passes through the data point.

11. The remaining life assessment apparatus according to claim 1,
wherein the comparative assessment part stores one or more of the obtained estimated state quantity change data pieces in the state quantity change database on a regular basis or with proper timing after start-up of the composite material structure.

12. The remaining life assessment apparatus according to claim 1,
wherein the comparative assessment part enables a display unit to display the estimated state quantity change data thus calculated and a remaining life obtained from the estimated state quantity change data on a graph plotting the state quantity and the load history on the respective coordinate axes and/or stores the estimated state quantity change data and the remaining life in a storage unit, or outputs the estimated state quantity change data and the remaining life to an external apparatus for display and/or storage purpose.

13. The remaining life assessment apparatus according to claim 1,
wherein the state quantity assessment part handles two or more kinds of the state quantities, and
the comparative assessment part expresses the state quantity change data in a space of three or more dimensions.

14. A wind turbine generator system comprising:
the remaining life assessment apparatus according to claim 1;
a wind turbine generator including the first sensor or the first sensor and the second sensor; and
an external apparatus for displaying and/or storing the estimated state quantity change data.

15. A remaining life assessment method comprising the steps of:
calculating a load history indicative of a cumulative damage degree of a composite material by using measurement data from one or more first sensors attached to the composite material forming a composite material structure;
calculating a state quantity indicative of a rigidity of an assessment region of the composite material by using measurement data from the first sensor or one or more second sensors attached to the composite material;
referring to a state quantity change database that holds a plurality of previously recorded state quantity change data pieces indicative of relation between the load history and the state quantity of the composite material; and
comparing the calculated load history and state quantity with a plurality of the state quantity change data pieces stored in the state quantity change database so as to obtain estimated state quantity change data indicative of state quantity change data corresponding to the calculated load history and state quantity, followed by displaying and/or storing and/or outputting the estimated state quantity change data.

* * * * *